United States Patent [19]

Hughes

[11] Patent Number: 4,475,217

[45] Date of Patent: Oct. 2, 1984

[54] RECEIVER FOR PHASE-SHIFT MODULATED CARRIER SIGNALS

[75] Inventor: William C. Hughes, Scotia, N.Y.

[73] Assignee: General Electric Company, Schenectady, N.Y.

[21] Appl. No.: 438,829

[22] Filed: Nov. 3, 1982

[51] Int. Cl.³ ............................................. H03D 3/02
[52] U.S. Cl. ..................................... 375/81; 375/120; 329/122
[58] Field of Search ...................... 375/80, 81, 82, 84, 375/97, 119, 120, 103; 455/208, 209; 328/55, 133; 329/122, 124, 125; 340/310 R, 310 A

[56] References Cited

U.S. PATENT DOCUMENTS

| 4,079,329 | 3/1978 | England et al. ..................... 375/120 |
| 4,085,378 | 4/1978 | Ryan et al. ........................... 375/81 |
| 4,100,499 | 7/1978 | Monrolin ............................... 375/81 |
| 4,143,322 | 3/1979 | Shimamura .......................... 375/81 |
| 4,285,060 | 8/1981 | Cobb et al. ........................... 375/120 |

*Primary Examiner*—Robert L. Griffin
*Assistant Examiner*—Stephen Chin
*Attorney, Agent, or Firm*—Bernard J. Lacomis; James C. Davis, Jr.

[57] ABSTRACT

A receiver for recovering digital data from a phase-shift modulated carrier in a data communications system employs a matched filter within the servo loop controlling the local oscillator frequency to increase the signal to noise ratio of the receiver. Thus signals having an amplitude less than the amplitude of harmonics of the carrier can be detected. In the preferred embodiment, the matched filter comprises an integrate and dump filter which integrates at the received data baud rate.

22 Claims, 6 Drawing Figures

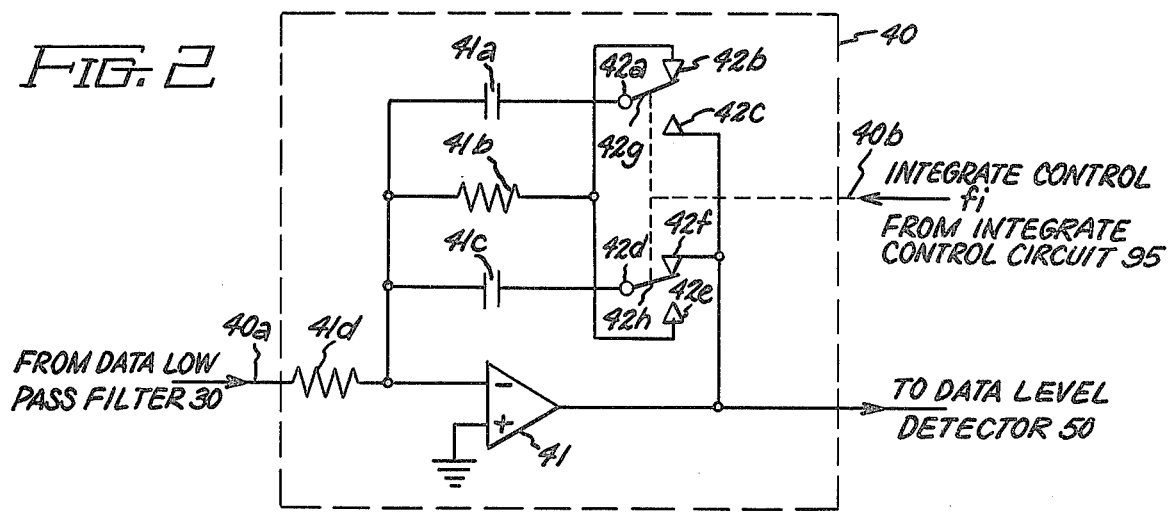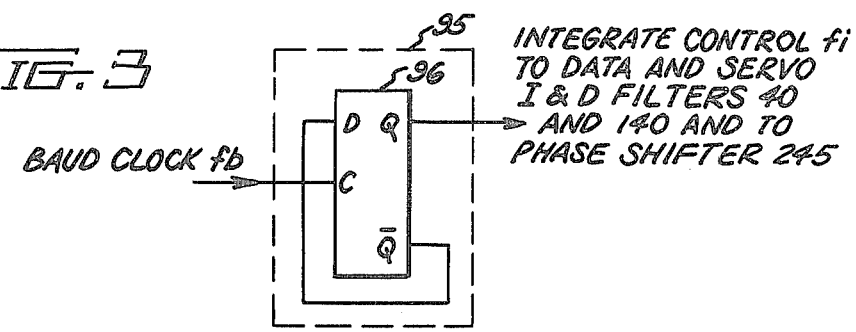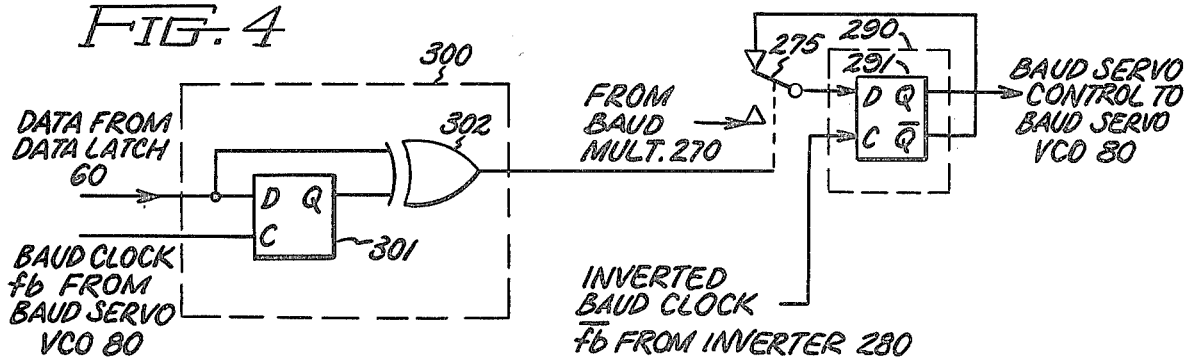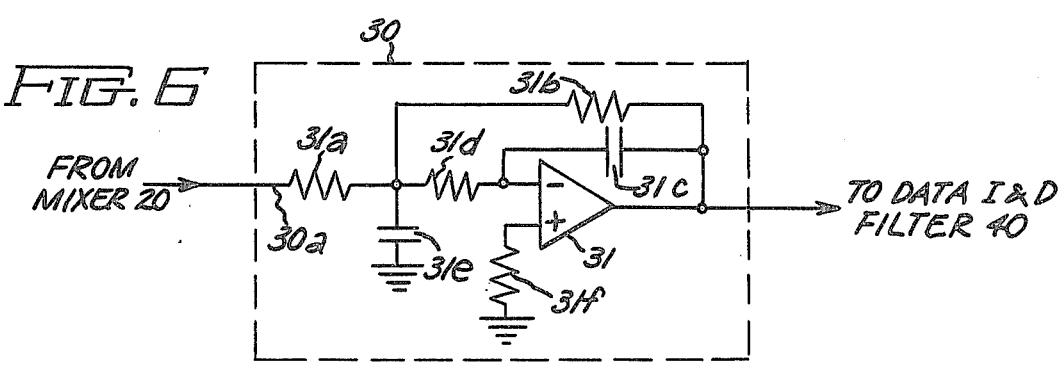

RECEIVER FOR PHASE-SHIFT MODULATED CARRIER SIGNALS,

BACKGROUND OF THE INVENTION

The present invention relates to digital communication receivers, and, more particularly, to a digital communications receiver for recovering data which has been phase-shift modulated onto a communications system carrier waveform.

It is known that digital information may be transmitted in a communications system by phase-shift modulation, wherein the phase of a carrier waveform is inverted, i.e. shifted by 180°, during each bit time interval in which a first binary data value is to be transmitted, and is maintained with the same phase as the immediately preceding bit time interval when the remaining binary data value is to be sent in a particular bit time interval. Alternatively, one phase may represent one binary data value and the 180° shifted phase the second binary data value. It is also known that digital information may be transmitted over powerlines between a central facility and a multiplicity of remote locations tied to the power distribution network. Powerline communication systems of this type are disclosed and claimed in Fong—U.S. Pat. No. 3,973,087 and Fong—U.S. Pat. No. 3,973,240, both issued Aug. 3, 1976; Fong—U.S. Pat. No. 3,944,723 issued Mar. 16, 1976; Bogacki et al.—U.S. Pat. No. 4,135,181, issued Jan. 16, 1979; and Bogacki—U.S. Pat. No. 4,161,720, issued July 17, 1979, all assigned to the assignee of the present application and all incorporated herein in their entirety by reference. In powerline communication systems, wherein a powerline frequency (typically 60 Hertz (Hz) in the United States) signal is present throughout the entire system, it is known that the signal-to-noise ratio of the received signal can be greatly improved if the transmitted carrier signal frequencies are odd multiples of the first sub-harmonic, i.e. 30 Hz, of that powerline frequency. Methods and apparatus for realizing such improvements in signal-to-noise are described and claimed in Stutt et al.—U.S. Pat. No. 4,101,834, issued July 18, 1978; and Kincaid et al.—U.S. Pat. No. 4,109,204, issued Aug. 22, 1978, both assigned to the assignee of the present application and incorporated herein by reference in their entirety.

In a data communications system in which the carrier is continuously present, even when the carrier is not modulated to transmit digital data to a receiving location, one presently known receiver for filtering out both systematic pulse and random noise to improve the signal-to-noise ratio is described and claimed in Fong—U.S. Pat. No. 3,944,932, issued Mar. 16, 1976, to the assignee of the present invention and incorporated herein by reference in its entirety. The receiver of U.S. Pat. No. 3,944,932 utilizes at least one narrow band-pass commutating filter preceded by at least one carrier-amplitude-limiting stage. The commutating filter requires a large number of precision resistance and capacitance elements having relatively high cost, and also requires careful adjustment of a number of control elements during assembly, further adding to production cost. A receiver having high rejection of undesirable signals, but also having a relatively low production cost, is highly desirable.

In another known receiver, described and claimed in Hughes—U.S. Pat. No. 4,298,986, issued Nov. 3, 1981, and assigned to the assignee of the present invention and incorporated herein in its entirety by reference, an improved signal-to-noise ratio is achieved, inter alia, by providing a phase-locked loop to generate a loop signal having a frequency essentially locked to the received carrier frequency, whereby synchronous detection is effected. However, little rejection of the harmonics of the powerline frequency, especially those harmonics having an amplitude greater than the level of the desired signal, is provided, thus causing a degradation in performance of the receiver under this condition. Most of the noise in a powerline carrier system is from harmonics of the powerline frequency. Thus it is desirable to have a receiver capable of maintaining harmonic rejection of these frequencies.

Accordingly, an object of the present invention is to provide a receiver having increased signal-to-noise performance when the amplitude of the harmonics of the powerline frequency are greater than the amplitude of the message signal.

Another object of the present invention is to provide a receiver with no narrow bandpass commutating filter and therefore having relatively few precision resistors and capacitors.

Yet another object of the present invention is to provide a receiver having a relatively low cost and no adjustment of control elements.

Still another object of the present invention is to provide a receiver capable of recovering transmitted data modulated onto a carrier signal waveform, wherein the recovered data has the same sense as the transmitted data.

SUMMARY OF THE INVENTION

In accordance with the present invention, a receiver for recovering digital data which has been phase-shift-modulated onto a carrier waveform in a digital communication system includes a relatively wide bandpass filter having an output providing a bandpass-filtered modulated carrier signal.

Mixing means are provided for mixing the bandpass-filtered modulated carrier signal with first and second local oscillator signals, which are in quadrature phase relationship with respect to each other, to form first and second recovered modulation signals respectively. Two servo loops producing a local oscillator signal and a local clock signal, respectively, are provided. The local clock signal controls the timing of the receiver circuitry so that the receiver is in synchronism with the transmitted data. A data channel for producing recovered data having the same sense as the transmitted data and each servo loop comprise a narrow, steep lowpass filter and an integrate and dump (I&D) filter which is dumped at the baud rate, thus acting as a matched filter for generating a data signal, an RF servo signal and a baud signal, respectively.

The RF servo signal is multiplied by the data signal and the resulting RF servo control signal is provided to a local oscillator frequency control means for varying the frequency of the local oscillator signals. The data signal is supplied to a latching means which provides a recovered data signal having the same logic sense as the digital data modulated upon the carrier waveform.

In an analogous manner, a baud servo control signal is generated from the multiplication of the data signal and baud signal. The baud servo control signal maintains the local baud clock output of the baud frequency control means in phase with the received data bauds.

The local baud clock signal is used to provide timing signals for the synchronous operation of the present receiver.

In a presently preferred embodiment, all required frequencies establishing the timing sequences and operation of the receiver are generated by frequency-arithmetic techniques.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DESCRIPTION OF THE DRAWING

FIG. 2 is a schematic diagram of an integrate and dump (I&D) filter fabricated in accordance with the present invention.

FIG. 3 is a schematic diagram of an integrate control circuit fabricated in accordance with the present invention.

FIG. 4 is a schematic diagram of a transition detector and latch circuit fabricated in accordance with the present invention.

FIG. 6 is a schematic diagram of a low pass filter circuit fabricated in accordance with the present invention.

DETAILED DESCRIPTION

Figure 1:
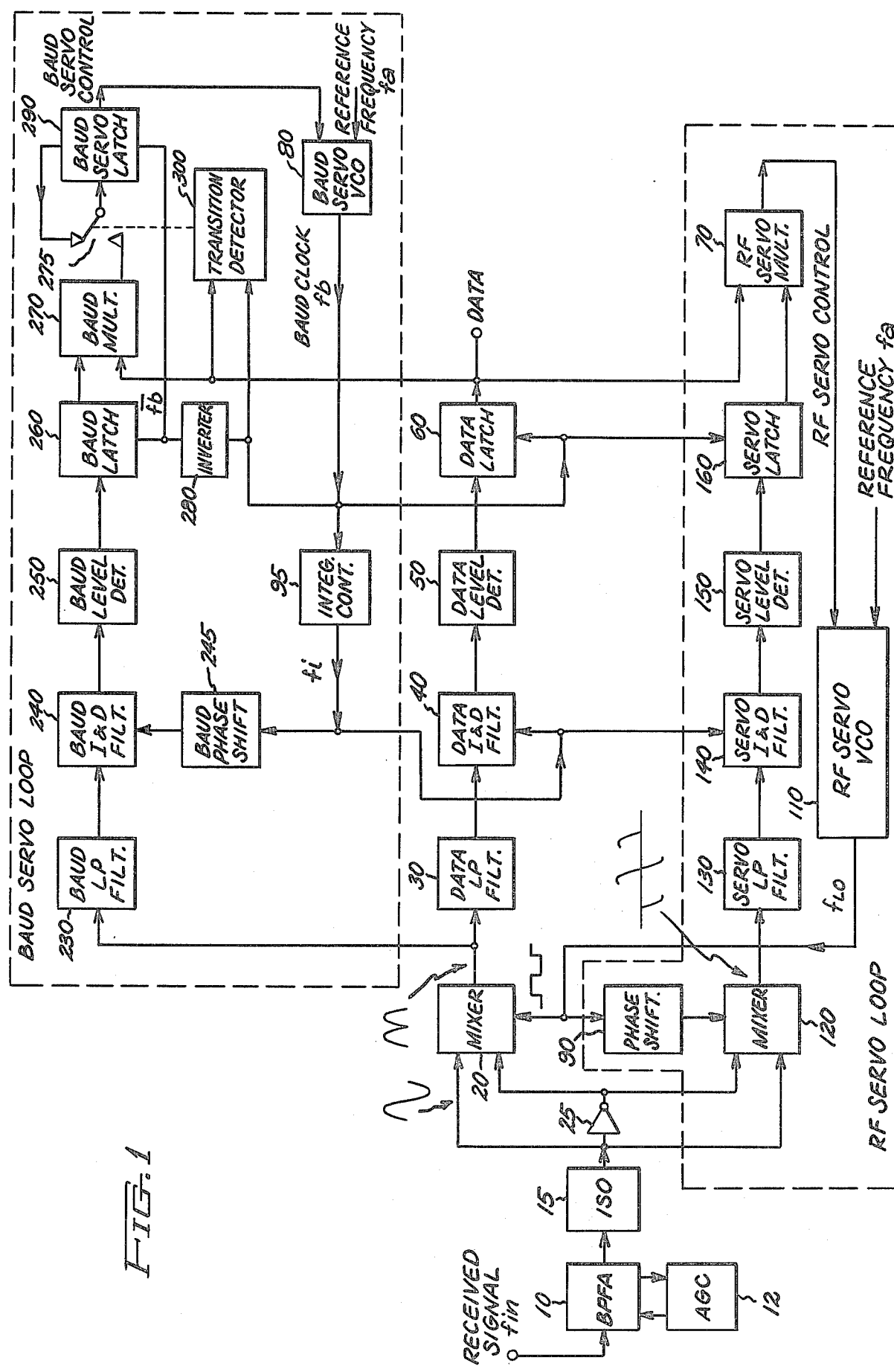
FIG. 1 is a block diagram of a receiver fabricated in accordance with the principles of the present invention.

Referring now to FIG. 1, a presently preferred embodiment of my digital communication system receiver for recovering digital data which is 180° phase-shift-modulated onto a carrier waveform is illustrated.

The carrier, which may or may not be continuously present, is transmitted at a selected frequency $f_{in}$. The carrier or input frequency is advantageously integrally related to one-half the system-wide frequency. In a powerline communication system, the input frequency advantageously will be an odd integer multiple of the powerline frequency first sub-harmonic. For purposes of illustration, the nominal 60 Hz powerline frequency $f_L$ may be utilized as the system wide frequency and the carrier frequency $f_{in}$ then equals $(2N+1)(f_L/2)$, where N is a non-negative integer. For example, if N=83, the nominal carrier frequency is 5010 Hz. It should be understood that the system-wide frequency may vary, e.g. the variation of the powerline frequency might, in some instances, be between lower and upper limits of 59.9 and 60.1 Hz, respectively, and that the carrier frequency advantageously is locked to the instantaneous value of the system-wide frequency and tracks the variations therein.

The carrier frequency waveform is advantageously modulated by shifting the phase thereof 180° whenever a transition in the modulating data bit stream occurs, e.g. from a first binary data value to a second binary data value, or vice-versa. The digitally modulated, i.e. 180° phase-shift-modulated, transmitted carrier frequency waveform signal is coupled to a first input of a bandpass filter-amplifier (BPFA) 10 of the receiver of FIG. 1 from a transmission medium, e.g. a powerline. The gain of filter-amplifier 10 is selected such that the signal at its first output connected to isolator 15 is not saturated at the highest amplitude level of signal expected to be received by the amplifier. The bandpass filter characteristics of filter-amplifier 10 are those of a relatively wide-band filter having the desired center frequency, e.g. 5010 Hz and 60 dB attenuation at a frequency of approximately three times the center frequency. Rejection of strong signals near the center frequency can be improved by making the characteristics of filter amplifier 10 narrower, e.g. 20 dB attenuation at 360 Hz from center frequency.

A second output of bandpass filter-amplifier 10 is connected to the input of an automatic gain control (AGC) circuit 12. The output of AGC circuit 12 is connected to a second input of filter amplifier 10. AGC circuit 12 acts to maintain the first output signal level of filter-amplifier 10 at a value which will constitute a relatively constant and nonsaturating output signal thereof thereby assuring that the maximum signal which can be conditioned by the remaining receiver circuits without saturation will be supplied to the input of isolator 15.

The first output of bandpass filter-amplifier 10 is coupled to the input of an isolator 15. The output of isolator 15 is coupled to first inputs of first and second mixer means 20 and 120, respectively, and to second inputs of first and second mixer means 20 and 120, respectively, through an inverter 25. Isolator 15 acts as a buffer between bandpass filter-amplifier 10 and first and second mixer means 20 and 120, respectively, to prevent any spurious signals produced by the mixers from coupling back into the first output of bandpass filter-amplifier 10.

Local oscillator signals, which are nominally at the carrier frequency, for first and second mixer means 20 and 120, respectively, are provided from the output of an RF servo voltage controlled oscillator (VCO) circuit 110 which is coupled to a third input of first mixer means 20 and to a third input of second mixer means 120 through phase shifter 90. The local oscillator signals are digitally encoded with each signal having an equal logic level low and a logic level high interval during the period of each signal. Phase shifter 90 establishees a phase relationship between the local oscillator signals provided to first and second mixer means 20 and 120, respectively, such that they are in quadrature, or 90° out of phase, with respect to each other. The local oscillator signals supplied to first and second mixers 20 and 120, respectively, act as switch control signals therein to provide either the buffered bandpass filter signal from isolator 15 or the inverted buffered bandpass signal from inverter 25 to the output of first and second mixer means 20 and 120, respectively. First and second mixer means 20 and 120, respectively, may each be an essentially linear mixer such as is disclosed in the aforementioned U.S. Pat. No. 4,298,986.

Whenever a local oscillator signal is a logic level low, the buffered bandpass filtered signal from isolator 15 is furnished to the output of the respective mixer means having the logic level low local oscillator signal supplied thereto and whenever a local oscillator signal is a logic level high, the inverted buffered bandpass filtered signal from inverter 25 is furnished to the output of the respective mixer means having the logic level low local oscillator signal supplied thereto. This coupling is provided because in the data channel (i.e. including mixer 20, a data lowpass filter 30, a data integrate and dump filter 40, a data level detector 50 and a data latch circuit 60) and baud servo channel or loop, (i.e. including a baud lowpass filter 230, a baud I&D filter 240, a baud level detector 250, a baud latch circuit 260, a baud multiplier 270, a baud servo latch circuit 290 and a baud servo VCO 80) it is desired to have the level switching of the local oscillator signal occur simultaneously with the zero crossing of the buffered or inverted buffered bandpass signals, which are analog signals, typically a sine wave. In the servo channel or loop (i.e. including phase shifter 90, mixer 120, a servo low pass filter 130, a servo integrate and dump filter 140, a servo level detector 150 and a servo latch circuit 160, an RF servo miltiplier 70, and an RF servo VCO 110) it is desired to have the level switching of the local oscillator signal occur at the peak (90°) and trough (270°) of the buffered or inverted buffered bandpass signals. Thus the output waveform of first mixer means 20 will appear as a positive valued scalloped signal wherein a 180° negative section of the sine wave between zero crossings is inverted while the output waveform of second mixer means 120 will appear as an "S" curve, similar to a conventional phase discriminator output.

The output of first mixer 20 is coupled to the inputs of data and baud lowpass filters 30 and 230, respectively, and the output of second mixer 120 is coupled to the input of servo lowpass filter 130, each lowpass filter having a filter characteristic selected to pass the difference frequency or base-band signal from first and second mixer means 20 and 120, respectively, and to attenuate the sum and all higher frequencies from first and second mixer means 20 and 120, respectively.

Data, servo and baud lowpass filters 30, 130, and 230, respectively; data, servo and baud integrate and dump (I&D) filters 40, 140 and 240, respectively; data, servo and baud level detector circuits 50, 150 and 250, respectively; and data, servo and baud latch circuits 60, 160 and 260, respectively, are identical and include corresponding equivalent components.

The output of data lowpass filter circuit 30 is coupled to a first input of data I&D filter 40. An integrate control signal $f_i$ is synchronized to the baud clock signal $f_b$ supplied by a baud servo voltage controlled oscillator (VCO) circuit 80, and is available at the output of an integrate control circuit 95. Integrate control circuit 95 supplies the integrate control signal $f_i$ to a second input of data and servo I&D filters 40 and 140, respectively, and to a second input of baud I&D filter 240 through a phase shifter 245, at a frequency which is one-half the local baud clock signal $f_b$ frequency. The baud clock signal $f_b$ frequency is nominally 30 Hz and thus the integrate control signal $f_i$ frequency is nominally 15 Hz.

Data I&D filter circuit 40 is designed so as not to saturate on the largest lowpass filtered signal available at the output of data lowpass filter 30 during the integrate time of the baud period e.g. 1/30 second. Any frequency component with a period of 1/30 second will integrate to zero at the end of the integrate time and therefore will not produce an output signal. Thus all harmonics of the power frequency tend to be removed by data I&D filter 40. The integration time of data I&D filter 40 is determined by the frequency of the integrate control signal $f_i$. Data I&D filter 40 which integrares at the baud rate is a matched filter, i.e. provides optimum filtering and therefore the best signal to noise ratio possible at its output for a given carrier signal waveform and modulation waveform at its input. Servo and baud I&D filters 140 and 240, respectively, are within the respective servo loops and their outputs are updated once each baud period. The combination of servo lowpass filter 130 and servo I&D filter 140 within the RF servo loop and baud lowpass filter 230 and baud I&D filter 240 within the baud servo loop, along with the other circuitry within the loops, provides harmonic rejection within the respective loops of harmonics with amplutudes greater than the amplitude of the message signal. Prior lowpass filters were not effective in removing harmonics. If situated within a servo loop, the filter characteristics could not be very steep due to the response time required by the servo loop to correct for frequency variations between the received signal and the local oscillator and/or local baud signals.

The outputs of data, servo and baud I&D filters 40, 140, and 240, respectively, are coupled to the inputs of data, servo and baud level detectors 50, 150 and 250, respectively. The data, servo and baud integrated output signals from data, servo and baud I&D circuits 40, 140 and 240, respectively, supplied to first inputs of data, servo and baud level detector means 50, 150 and 250, respectively, are in analog form and are squared-up by level detectors 50, 150 and 250, respectively. That is, the analog signal waveforms at the inputs of level detectors 50, 150 and 250, respectively, are converted to digitally encoded signals at outputs, respectively, thereof. The state, i.e. logic level high or low, of the output signals of level detectors 50, 150 and 250, respectively, is determined by whether or not the integrated input alalog signal the level detectors 50, 150 and 250 has exceeded a predetermined threshold at the end of the integrate time. These digitally encoded signals have rapid rise and fall times at the transitions from logic level low to high and from logic level high to low, respectively. The sharply-transitioning data, servo and baud level detected output signals available at the outputs of data, servo and baud level detectors 50, 150 and 250, respectively, are supplied to a first input of each of data, servo and baud latch circuits 60, 160 and 260, respectively. A second input of each of data and servo latch circuits 60 and 160, respectively, is supplied with the baud clock signal $f_b$ from baud servo VCO circuit 80 and a second input of baud latch circuit 260 is supplied with the baud clock signal $f_b$ from a baud servo VCO circuit 80 through an inverter circuit 280. The data signal is available at the output of data latch circuit 60, the servo signal is available at the output of servo latch circuit 160, and the baud signal is available at the output of baud latch circuit 260.

The data and servo signals are only valid at the end of each data bit interval because only then have data and servo I&D filters 40 and 140, respectively, completed their integration to remove harmonic noise. Therefore, the data and servo signals are sampled only at the end of a bit interval by baud clock signal $\overline{f_b}$ supplied to data and servo latch circuits 60 and 160, respectively. The baud signal is only valid at the middle of each data bit interval and therefore the baud signal is sampled at the middle of each data bit by the inverted baud clock signal $f_b$ supplied to baud latch circuit 260 from inverter 280. Thus the recovered data, servo and baud signals available at the first input of data, servo and baud latch circuits 60, 160 and 260, respectively are provided to the outputs of data, servo and baud latch circuits 60, 160 and 260, respectively during each sampling interval and the values thereof remain constant until the next sampling interval.

The output of data latch circuit 60 is also coupled to a first input of RF servo multiplier circuit 70, and the output of servo latch circuit 160 is coupled to a second input of RF servo multiplier circuit 70, wherein the data and servo signals provided to the first and second inputs thereof are multiplied. The product or RF servo control signal is supplied to a first input of RF servo VCO circuit 110 as a binary encoded signal. The multiplication of the data and servo signals is necessary in order to remove any polarity reversals from the servo signal and thereby to maintain the proper RF servo loop polarity of the RF servo control signal available at the output of RF servo multiplier circuit 70. The polarity of the RF servo control signal determines whether the local oscillator signal frequency provided by the RF servo VCO circuit 110, with respect to the received carrier frequency, is to be speeded up or slowed down in order to match the received frequency and thereby enable the receiver to act as a synchronous receiver when they are equal. When the polarity of the data signal available at the output of data latch circuit 60 changes, the polarity of the data signal supplied to the input of RF servo multiplier circuit 70 likewise changes. Thus if the phase of the received signal is switched 180° between bauds, as may be the case when data is being transmitted, both input signals to RF servo multiplier 70 will reverse polarity so that the RF servo control signal available therefrom will remain the same as if no phase shift had occurred.

In an analogous manner, the output of data latch circuit 60 is coupled to a first input of baud multiplier circuit 270 and the output of baud latch circuit 260 is coupled to a second input of baud multiplier circuit 270 wherein the data and baud signals provided to the first and second inputs thereof are multiplied. The polarity of the baud servo control signal, which in certain cases as hereinafter explained is formed from the product or output of baud multiplier 270, determines whether the baud clock or local baud signal $f_b$ is to be speeded up or slowed down with respect to the received data baud rate in order to match the received data and local baud rates. When the polarity of the data signal available at the output of data latch circuit 60 changes, the polarity of the data signal supplied to the input of baud multiplier circuit 270 likewise changes. Thus if the phase of the received signal is switched 180° between bauds, as may be the case when data is being transmitted, both input signals to baud multiplier circuit 270 will reverse polarity so that the output signal available therefrom will remain the same as if no phase shift had occurred.

The product from baud multiplier circuit 270 is supplied to a terminal of a normally open switch 275. The status of switch 275 is controlled by the output of transition detector circuit 300 coupled thereto. The data signal from data latch 60 is coupled to a first input of transition detector circuit 300 and the baud clock signal $f_b$ is coupled to a second input of transition detector circuit 300. Transition detector circuit 300 determines whether the value of the data signal supplied thereto during a baud period has changed in value from the data signal supplied thereto during the previous baud period. If a change in the value of the data signal has occurred between successive baud periods then the output of transition detector 300 orients switch 275 such that the output of baud multiplier circuit 270 is connected to a first input of baud servo latch circuit 290 through switch 275. If no change in the value of the data signal has occurred between successive baud periods then the output of transition detector 300 orients switch 275 such that a second output of baud servo latch circuit 290 is connected through switch 275 to the first input of baud servo latch circuit 290. A second input of baud servo latch circuit 290 is supplied with the baud clock signal $f_b$ through inverter 280. Baud servo latch 290 provides the baud servo control signal available at the output thereof to a first input of baud servo VCO circuit 80.

The baud servo loop generates the local baud clock signal $f_b$ having the same frequency and phase as the bauds of the received data. Each transition in the received data is examined to determine whether it leads or lags the baud clock signal $f_b$. In the preferred embodiment, if it leads, i.e. the received data frequency is greater than the baud clock signal $f_b$ frequency, then the baud servo control signal output from baud servo latch 290 is negative. If it lags, i.e. the received data frequency is less than the baud clock signal $f_b$ frequency, then the baud servo control signal output from baud servo latch 290 is positive. During periods when there are no phase transitions of the received data and thus no readily available information with respect to the received baud rate, the baud servo control signal assumes a positive value and then a negative value of the same amplitude during alternate periods of baud clock signal $f_b$, thus averaging approximately zero and effecting a minimum change in the phase of baud clock signal $f_b$ from the output of baud servo VCO 80.

The RF servo VCO 110 and baud servo VCO 80 are each provided at a second input thereof with a reference frequency signal $f_a$, which signal establishes the nominal output frequencies of the RF servo VCO 110 and the baud servo VCO 80. The reference frequency signal $f_a$ may be conveniently generated by a phase locked loop (PLL) (not shown) locked to the instantaneous powerline frequency such as is described in the aforesaid U.S. Pat. No. 4,101,834. In a presently preferred configuration of the present invention, the reference frequency signal $f_a$ is also provided to the data transmission circuitry (not shown) wherein it is used as a reference for the transmission frequency. Thus, only relatively minor changes are required in the frequencies of the output signals from RF servo VCO 110 and baud servo VCO 80 as determined by the status of the RF servo and baud servo control signals, respectively, in order to match the phase of the received frequency with the phase of the local oscillator signals and the local baud clock signal $f_b$.

Since the servo systems operate to change the local oscillator and local baud clock signal frequencies in discrete steps, the signal frequencies will tend to fluctuate about the desired frequency. However, the excursions from the desired frequency are insignificant since the frequencies are substantially equal to the received frequency and the discrete step frequency changes are relatively small. Thus there is no need to make adjustments in the local oscillator or local baud clock signal frequencies within one cycle of the local baud clock $f_b$.

Thus has been illustrated and described a receiver for recovering transmitted data modulated onto a carrier waveform, wherein the recovered data has the same sense as the transmitted data. A steep lowpass filter and an integrated dump filter are within the servo loop to provide harmonic rejection of the harmonics of the carrier frequency. Thus the receiver is capable of discerning the transmitted data even if the harmonics of the carrier are greater than the transmitted data.

A local timing signal is generated from the bauds of the received signal which local timing signal coordinates the integration to ensure that all harmonics of the carrier frequency are removed.

Certain components of the receiver shown in FIG. 1 are illustrated in greater detail in FIGS. 2-6. Data, servo and baud integrate and dump (I&D) filters 40, 140 and 240, respectively, are identical and include corresponding equivalent components. For simplicity, therefore, FIG. 2 illustrates only data I&D filter 40 and its respective components.

As shown in FIG. 2, input 40a of data I&D filter 40 connects the output of data lowpass filter 30 (shown in FIG. 1) to an integrating resistor 41d. Data I&D filter 40 also comprises operational amplifier 41, integrating capacitors 41a and 41c, discharge resistor 41b and switch or exchanging means 42, such as an electronic switch. The non-inverting input of operational amplifier 41 is connected to ground potential.

Contactor 42g of switch means 42 connects terminal 42a to either terminal 42b or 42c and contactor 42h connects terminal 42d to either terminal 42e or 42f. Contactors 42g and 42h are shown ganged, or arranged to switch at the same time and to connect terminals 42a to 42b and terminals 42d to 42f at the same time. Likewise, terminals 42a and 42c and terminals 42d and 42e are connected at the same time. Thus either integrating capacitor 41a or 41c is switched into connection between the inverting input and output of operational amplifier 41 in the integration mode, as a function of the state of contactors 42g and 42h of switch means 42. Resistor 41b is switched into parallel connection with the one capacitor 41a or 41c not connected across operational amplifier 41, thus allowing the non-connected capacitor to discharge through resistor 41b in order to permit the non-connected capacitor to be used in a subsequent integration. The value of resistor 41b is selected to ensure that the discharging capacitor will be totally discharged during the discharge period.

Switching control for switch means 42 is provided by the integrate control signal $f_i$, available at input 40b of data I&D filter 40. Integrate control signal $f_i$ is synchronized to the baud clock signal $f_b$ and is available at the output of integrate control circuit 95 (FIG. 1).

Capacitors 41a and 41c will alternately be switched between the integrate and discharge mode, remaining in each mode 1/30 second and thus establishing the integration interval of 1/30 second. The values of resistor 41d and of capacitors 41a and 41c, which have the same value, are selected so that I&D circuit 40 will not saturate on the largest bandpass filtered modulated carrier output signal available at the output of bandpass filter-amplifier circuit 10 (shown in FIG. 1) during the integration interval. Any frequency component with a period of 1/30 second will integrate to zero at the end of the integration interval and therefore will not produce an output signal. Thus all harmonics of the power frequency are removed by data I&D filter means 40. The output of operational amplifier 41 constitutes the output of data I&D filter means 40 and is connected to the input of data level detector 50 (shown in FIG. 1).

Switching is necessary so that the integrations of data I&D filter means 40 will be completed during each half-cycle of the baud clock signal $f_b$. Integration in I&D filter 40 occurs at the baud rate and in phase with the received bauds. Since the incoming data is modulated by abrupt phase changes between bauds, I&D filter 40 is a matched filter.

Integrate control circuit 95 as shown in FIG. 3 comprises a D-type flip-flop logic element 96, which may be part of a single CMOS 4042 type integrated circuit or the like, having the data D input and $\overline{Q}$ output thereof connected together. The clock C input of flip-flop element 96, which constitutes the input of integrate control circuit 95, receives the baud clock signal $f_b$ thereat. The Q output of flip-flop element 96 constitutes the output of integrate control circuit 95 and is connected to input 40b of I&D filter 40 shown in FIG. 2, thus providing the integrate control signal $f_i$, having a frequency one-half the baud clock signal $f_b$, thereat. Baud clock signal $f_b$ frequency is typically 30 Hz and thus the integrate control $f_i$ frequency is typically 15 Hz. Integrate control signal $f_i$ is provided from the circuit of FIG. 3 to switch means 42 of data I&D filter 40, shown in FIG. 2, causing contactors 42g and 42h to alternately connect capacitors 41a and 41c, respectively, in the integrate mode with operational amplifier 41 during each half cycle of the integrate control signal $f_i$. For baud servo I&D filter 240 as shown in FIG. 1, the integrate control signal $f_i$ is supplied thereto through phase shifter 245, which shifts the integrate control signal 90°, establishing an in phase relationship between the control signal provided to I&D filter 240 from phase shifter 245 and the received baud signals.

Transition detector circuit 300 as shown in FIG. 4 comprises a D-type flip-flop logic element 301, which may be part of a single CMOS 4042 type integrated circuit or the like, and an exclusive - OR gate 302, which may be part of a single CMOS 4070 type integrated circuit or the like. The data signal from data latch 60 (shown in FIG. 1) is provided to the D input of flip-flop logic element 301 and to a first input of exclusive-OR gate 302. The Q output of flip-flop logic element 301 is connected to a second input of exclusive-OR gate 302. The baud clock signal $f_b$ provided to the clock C input of flip-flop logic element 301 causes the value of the data signal present at the data D input thereof to be transferred to the Q output thereof at each positive-going transition of the baud clock signal $f_b$, thus storing the data value at the Q output thereof for the remainder of the baud period. Because data latch 60 and flip-flop element 301 are both toggled from the same clock source, i.e. baud clock signal $f_b$, the data value of the present and previous baud periods will be present at the first and second inputs of exclusive-OR gate 302, respectively. The binary coded output of exclusive-OR gate 302 is provided to a switch 275 as a control signal. When the value of the data signal has not changed between successive baud periods, the signal input values to exclusive - OR gate 302 will be equal and the output therefrom will be a logic level low, causing switch 275 to assume its normally closed position.

Baud servo latch circuit 290 comprises a flip-flop logic element 291 which may be part of a single 4042 type integrated circuit or the like. When the $\overline{Q}$ output of flip-flop logic element 291 is coupled to the data D input thereof through normally closed contacts of switch 275, the Q output of flip-flop element 291, which constitutes the output of baud servo latch circuit 290, will assume alternate binary values during successive periods of the inverted baud clock signal $\overline{f_b}$ which is supplied to the clock C input thereof. By assuming alternate binary values, the baud servo control signal supplied to baud servo VCO 80 (FIG. 1) from the output of baud latch circuit 290 will have an average value of approximately zero, thus causing the frequency and thereby the phase of the baud clock signal $f_b$ to maintain its previous value.

If the value of the data signal changes between successive baud periods, then the inputs to exclusive-OR gate 302 will be different, causing a logic level high to be present at the output thereof. Switch 275 is thus actuated such that the output from baud multiplier 270 (FIG. 1) is connected to the data D input of flip-flop logic element 291 through switch 275. If the received data bauds are leading the local baud clock signal $f_b$ then the baud servo control signal will be positive on average.

Figure 5:
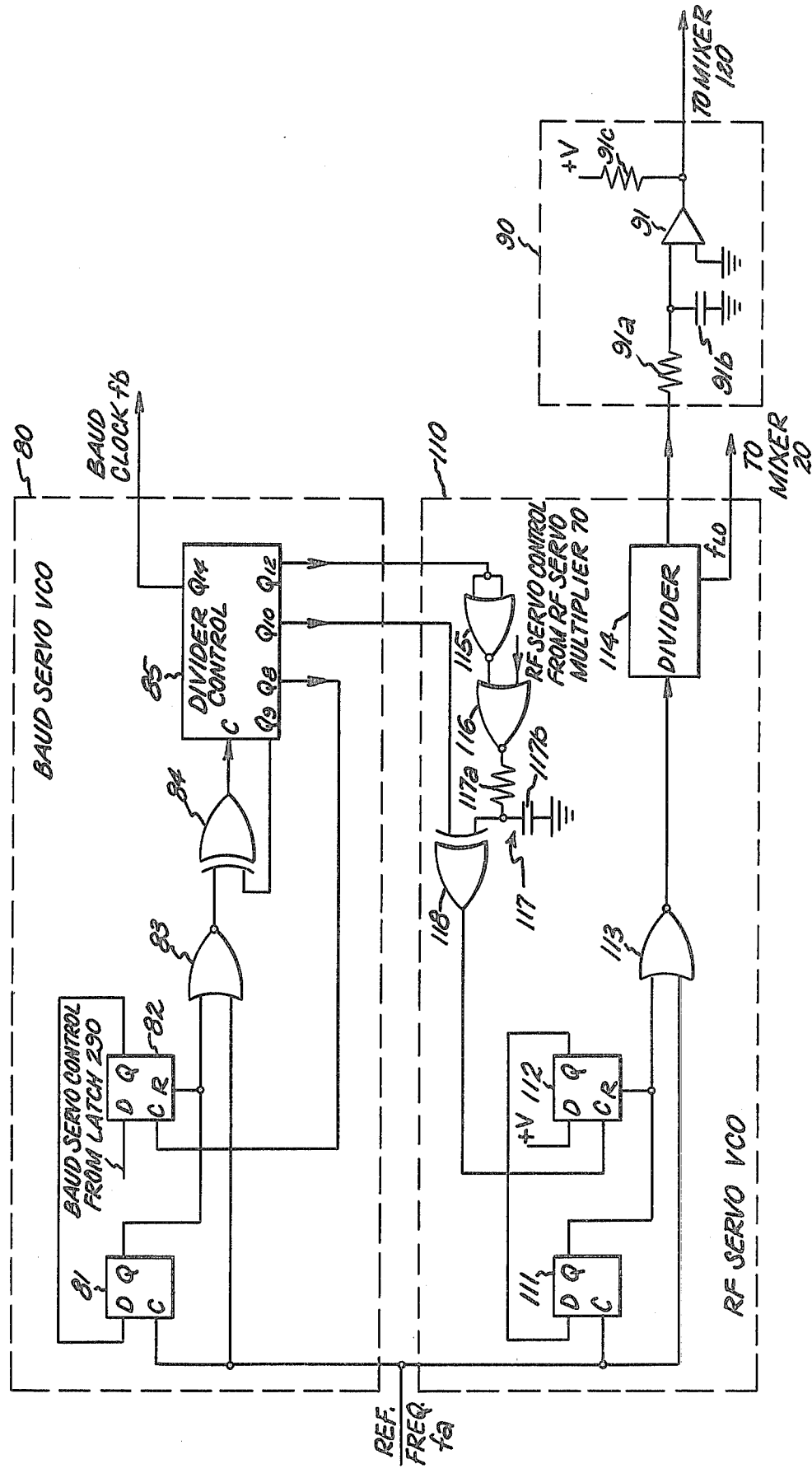
FIG. 5 is a schematic diagram of a baud servo VCO and an RF servo VCO circuit fabricated in accordance with the present invention.

FIG. 5 illustrates how the local baud clock signal $f_b$ and the local oscillator signal $f_{LO}$ are generated by frequency arithmetic techniques. Baud servo VCO 80 comprises a pair of D type flip-flop logic elements 81 and 82, a NOR gate 83, an exclusive-OR gate 84 and a divider counter 85. D-type flip-flop logic elements 81 and 82 may be part of a single CMOS 4042 type integrated circuit or the like, NOR gate 83 may be part of a single CMOS 4001 type integrated circuit or the like, exclusive OR gate 84 may be part of a single CMOS 4070 type integrated circuit or the like and divider counter 85 may be a CMOS 4020 type integrated circuit or the like.

Components of baud servo VCO 80 including D-type flip-flop logic elements 81 and 82 and NOR gate 83 co-act to form a subtraction means to remove one transition from the reference frequency signal $f_a$ supplied to the clock C input of D-type flip-flop logic element 81 and to a first input of NOR gate 83, each time a positive transition occurs in the signal from output port $Q_8$ of divider counter 85 which is supplied to the clock C input of D-type flip-flop logic element 82. In a presently preferred embodiment of the instant invention, reference frequency $f_a$ is a nominal 491520 Hz signal provided from a master phase locked loop (not shown) as hereinbefore described. The frequency of the reference frequency signal $f_a$ is actually 8192 times the prevailing power frequency. The baud servo control signal from baud servo latch 290 (FIG. 1) is provided to the data D input of flip-flop logic element 82. When the baud servo control signal is a logic level high, the subtraction means of baud servo VCO 80 is inactivated. When the baud servo control signal is a logic level low, the subtraction means of baud servo VCO 80 is activated and 1920 transitions per second are subtracted from the reference frequency signal $f_a$.

The output of NOR gate 83 is provided to a first input of exclusive-OR gate 84. A second input of exclusive-OR gate 84 is connected to the $Q_9$ output port of divider counter 85. The internal delays provided in divider counter 85 are such that transitions on the first and second inputs to exclusive-OR gate 84 are not simultaneous. Thus the number of transitions per second at the output of exclusive-OR gate 84, which is coupled to the clock C input of divider counter 85, is the sum of the transitions occurring at each input to exclusive-OR gate 84. Divider counter 85 is a multistage counter which divides the signal supplied to the clock C input thereof to produce various output signals which are available at output ports of divider counter 85 represented by the designation Q with a subscript number. The subscripts of the Q output ports of divider counter 85 represent the power of 2 by which the input signal frequency of divider counter 85 is divided to form the output signal at the respective port. Thus the baud clock signal $f_b$ available at output port $Q_{14}$ of divider counter 85 is equal to the input signal frequency divided by $2^{14}$ or nominally 30 Hz. Divider counter 85 is also advantageously employed to provide signals to RF servo VCO circuit 110.

RF servo VCO 110 comprises D-type flip-flop logic elements 111 and 112, NOR gates 113, 115 and 116, a divider circuit 114, an exclusive-OR gate 118 and a filter or delay circuit 117. D-type flip-flop logic elements 111 and 112 may be part of a single CMOS 4042 type integrated circuit or the like, NOR gates 113, 115 and 116 may be part of a single CMOS 4001 type integrated circuit or the like, exclusive-OR gate 118 may be part of a single CMOS 4070 type integrated circuit or the like and divider circuit 114 may comprise a serially-connected pair of CMOS 4018 type integrated circuits or the like.

The data D input of flip-flop logic element 111 is coupled to the Q output of flip-flop logic element 112 and the Q output of flip-flop logic element 111 is coupled to the reset R of flip-flop logic element 112 and to a first input of NOR gate 113. A second input of NOR gate 113 is supplied with the reference frequency signal $f_a$. D-type flip-flop logic elements 111 and 112 and NOR gate 113 co-act to form a subtraction means to remove one transition from the reference frequency signal $f_a$, provided to the clock C input of flip-flop logic element 111, each time a positive transition occurs in the signal supplied to the clock C input of flip-flop logic element 112 from exclusive-OR gate 118. The output of NOR gate 113, having the local oscillator modified reference signal available thereat, is coupled to the input of divider circuit 114. A first output of divider circuit 114 whereat the local oscillator frequency $f_{LO}$ is available is coupled to mixer 20 (FIG. 1). A second output of divider circuit 114, providing a signal which is almost 90° out of phase with the signal from the first output of divider circuit 114, is coupled to one end of a resistor 91a of phase shifter 90. The frequencies of the signals available at the first and second outputs of divider circuit 114 are the same. However, phase shifter 90 ensures that the local oscillator signal provided to mixer 120 (FIG. 1) from the output of phase shifter 90 will be exactly 90° out of phase with respect to the local oscillator signal provided to mixer 20 (FIG. 1). In a presently preferred embodiment of the present invention, the CMOS 4018 type integrated circuits of divider circuit 114 are configured to divide by 98.

Phase shifter 90 comprises resistor 91a and 91c, capacitor 91b and level detector 91. Level detector 91 may be an LM 339 type of integrated circuit or the like. A non-inverting terminal of level detector 91 receives the signal from the second output of divider circuit 114 through resistor 91a. A capacitor 91b is connected between the non-inverting input of level detector 91 and ground potential. The inverting input of level detector 91 is connected to ground potential. The output of level detector 91, being an open-collector device, is connected through a pull-up resistor 91c to a source of positive operating potential +V. The output of level detector 91 also constitutes the output of phase shifter 90 and is coupled to mixer 120 (FIG. 1) thus providing the local oscillator signal thereto.

The signal from output port $Q_{10}$ of divider counter 85 is supplied to a first input of exclusive-OR gate 118 and the signal from output port $Q_{12}$ of divider counter 85 is supplied to first and second inputs of NOR gate 115 which thus provides the inverted signal at its output. The output of NOR gate 115 is coupled to a first input of NOR gate 116. A second input of NOR gate 116 is provided with the RF servo control signal from RF servo multiplier 70 (FIG. 1). The output of NOR gate 116 is connected to a second input of exclusive-OR gate 118 through resistor 117a. The second input of exclusive-OR gate 118 is connected to ground potential through capacitor 117b. Resistor 117a and capacitor 117b of delay circuit 117 prevent transitions on the first and second inputs to exclusive-OR gate 118 from occurring simultaneously. When the RF servo control signal is a logic level high, the transitions in the signal from output port $Q_{12}$ of divider counter 85 are prevented from appearing at the output of NOR gate 116 and thus from being added to the transitions in the signal from output port $Q_{10}$ of divider counter 85 in exclusive-OR gate 118. When the RF servo control signal is a logic level low, transitions in the signal from output port $Q_{12}$ of divider counter 85 will appear at the second input of exclusive-OR gate 118 and be added to the transitions in the signal from output port $Q_{10}$ of divider counter 85. Thus the transitions in the signal available at the output of exclusive-OR gate 118 will comprise the sum of transitions in the signals from NOR gate 116 and output port $Q_{10}$ of divider counter 85. The output of exclusive-OR gate 118 is coupled to the clock C input of flip-flop logic element 112. The subtraction means of RF servo VCO 110 removes one transition from the reference frequency signal $f_a$ each time the signal provided to the clock C input of flip-flop logic element 112 transitions positive.

Thus the reference frequency signal $f_a$ supplied to RF servo circuit 110 is at a frequency which is slightly higher than the desired local oscillator frequency. The RF servo control signal causes a greater or lesser number of pulses to be subtracted from the reference frequency signal $f_a$ such that the resulting local oscillator signals available at the first output of divider circuit 114 and output of phase shifter 90 are slightly higher or slightly lower if averaged over an extended time interval than the desired local oscillator frequency.

Data, servo and baud low pass filters 30, 130 and 230, respectively, shown in FIG. 1, are identical and include corresponding equivalent components. For simplicity, therefore, FIG. 6 illustrates only data low pass filter 30 and its respective components. Input 30a of data low pass filter 30 connects the output of mixer means 20 (FIG. 1) to a filter resistor 31a of data low pass filter 30. Data low pass filter 30 comprises an operational amplifier 31, which may be part of a 4741 type integrated circuit or the like, filtering resistors 31b and 31d, filtering capacitors 31c and 31e and an offset resistor 31f.

The non-inverting input of operational amplifier 31 is connected to ground potential through offset resistor 31f. Resistor 31a is connected to resistor 31d and the junction thereof is connected to ground potential through filter capacitor 31e. The junction of resistor 31a and 31d through resistor 31b and the inverting input of operational amplifier 31 through filter capacitor 31c are connected to the output of operational amplifier 31. The output of operational amplifier 31 which constitutes the output of data lowpass filter 30 is connected to the input of data I&D filter 40 (FIG. 1). The values of resistors 31a, 31b and 31d and of capacitors 31c and 31e are selected such that the data lowpass filter 30 of a presently preferred embodiment of the instant invention has the following parameters: Q=0.58; $f_o$ (cut off frequency)=30.8 Hz; k(gain) k(gain)=1.

Data lowpass filter 30 allows input signals in the frequency range of 0 to about 30 Hz. to appear at the output thereof with a maximum of 3 db attenuation, and attenuates signals greater than about 30 Hz in a uniformly decreasing manner. The combination f the data lowpass filter 30 and the data I&D filter 40, provides an attenuation greater than 40 db to the 30 Hz signal, i.e. the first harmonic of the sub-carrier frequency, between the input of data lowpass filter 30 and the output of data I&D filter 40.

Thus has been described a receiver exhibiting increased signal-to-noise performance. The receiver is capable of receiving messages in which harmonics of a communications carrier signal waveform are greater than the desired data signal which has been phase shift modulated onto the carrier signal waveform and of recovering the desired data having the same sense as the transmitted data from the modulated signal. Further, the receiver has no narrow bandpass commutating filter with the attendant precision resistors and capacitors. The receiver has no adjustment of control elements and the general availability of the parts gives it a relatively low cost.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A receiver for recovering digital data modulated upon a carrier waveform in a digital communication system comprising:
    (a) first frequency generating means responsive to a first servo control signal for producing first and second local oscillator signals;
    (b) mixing means coupled to said first frequency generating means for mixing the modulated carrier with each of said first and second local oscillator signals to form first and second recovered modulation signals, respect- ively;
    (c) first filtering means coupled to said mixing means for increasing the signal-to-noise ratio in said first and second recovered modulation signals;
    (d) second filtering means responsive to a first system timing signal and coupled to said first filtering means for further increasing the signal-to-noise ratio in said first and second recovered modulation signals to form data and servo signals, respectively; and
    (e) first multiplier means coupled to said second filtering means for multiplying said data and servo signals to form the first servo control signal.

2. The receiver of claim 1 wherein said first filtering means comprises a low-pass filter.

3. The receiver of claim 2 wherein said low-pass filter has a quality factor of 0.50; a cutoff frequency of 30.8 Hz and a gain of unity.

4. The receiver of claim 1 wherein said second filtering means comprises:
    (a) first and second switching means;
    (b) first and second capacitive elements coupled to said first switching means, respectively;
    (c) third and fourth capacitive elements coupled to said second switching means, respectively;
    (d) a first resistive element coupling said first and second capacitive elements, respectively, to said first filtering means and a second resistive element coupling said third and fourth capacitive elements, respectively, to said second filtering means so as to charge said first and second capactive elements and said third and fourth capacitive elements with the level of said first and second recovered modulation signals, respectively;

(e) first discharging means coupled to said first switching means, whereby one of said first and second capacitive elements is discharged therethrough; and (f) second discharging means coupled to said second switching means, whereby one of said third and fourth capacitive elements is discharged therethrough.

5. The receiver as in claim 4 further comprising a flip-flop logic element having a data D input coupled to a Q̄ output thereof, a clock C input adapted to receive said first system timing signal and a Q output coupled to said first and second switching means for controlling the switching rate of said first and second switching means, respectively.

6. The receiver of claim 1, further comprising bandpass filtering means coupled to said mixing means for filtering the modulated carrier supplied to said mixing means.

7. The receiver of claim 6, further comprising gain control means coupled to said bandpass filtering means for limiting the amplitude of the modulated carrier supplied to said bandpass filtering means.

8. The receiver of claim 1, wherein said first frequency generating means comprises:

(a) subtraction means responsive to a reference signal of a predetermined frequency and to a second system timing signal for decreasing said predetermined frequency; and (b) means coupling said first multiplier means to said subtraction means so as to allow said first servo control signal to modify said second system timing signal when the frequency of said first and second local oscillator signals is greater than the frequency of said carrier waveform thereby forming a local oscillator modified reference signal.

9. The receiver of claim 8 wherein said subtraction means comprises:

(a) first and second flip-flop logic elements, said first flip-flop logic element having a reset R input and each of said first and second flip-flop logic elements having a clock C input, a data D input and a Q output, the Q output of said first flip-flop logic element being coupled to the data D input of said second flip-flop logic element, the clock C input of said first flip-flop logic element being adapted to receive said second system timing signal, the data D input of said first flip-flop being coupled to a source of positive operating voltage and the reset R input thereto coupled to the Q output of said second flip-flop logic element, the clock C input of said second flip-flop logic element being adapted to receive said reference signal; and (b) a NOR gate having a first input thereto adapted to receive said reference signal and a second input thereto coupled to the Q output of said second flip-flop logic element, the output of NOR gate producing said local oscillator modified reference signal at a frequency decreased from said predetermined frequency.

10. The receiver of claim 9 further comprising divider means coupled to the output of NOR gate for producing said first and second local oscillator signals.

11. The receiver of claim 10 wherein said divider means are adapted to generate said first and second local oscillator signals which are in quadrature phase relationship with respect to each other.

12. The receiver of claim 8 wherein said means coupling said first multiplier means to said subtraction means comprises:

(a) a NOR gate having a first input adapted to receive a third system timing signal and a second input adapted to receive said servo control signal; and (b) an exclusive-OR gate having a first input adapted to receive a fourth system timing signal and a second input coupled to the output of said NOR gate, the output of said exclusive-OR gate producing said second system timing signal.

13. The receiver of claim 12 including a resistor coupling the output of said NOR gate to the second input of said exclusive-OR gate and including a capacitor coupling the second input of said exclusive-OR gate to ground potential.

14. The receiver of claim 1 further comprising:

(a) second frequency generating means responsive to a second servo control signal for producing said first system timing signal;

(b) third filtering means coupled to said mixing means and responsive to said first system timing signal for increasing the signal to noise ratio in said first recovered modulation signal to form a baud signal;

(c) second multiplier means coupled to said third filtering means for mulitplying said data and baud signals; and (d) select means responsive to a transition signal and the first system timing signal for controllably coupling either the output from said second multiplier or an internal timing signal to said second frequency generating means to form the second servo control signal.

15. The receiver of claim 14 wherein said third filtering means comprises:

(a) switching means;

(b) first and second capacitive elements coupled to said switching means;

(c) a resistive element coupling said first and second capacitive elements, respectively, to said mixing means so as to charge said first and second capacitive elements with the level of said first recovered modulation signal; and (d) discharging means coupled to said switching means, whereby one of said first and second capacitive elements, is discharged therethrough.

16. The receiver of claim 14 wherein said second frequency generating means comprises:

(a) subtraction means responsive to a reference signal of a predetermined frequency and to a second system timing signal for decreasing said predetermined frequency; and (b) means coupling said select-means to said subtraction means so as to allow said second servo control signal to decrease said second system timing signal frequency when the frequency of the digital data is less than the frequency of said first system timing signal, thereby forming a local baud clock modified reference signal.

17. The receiver of claim 16 wherein said subtraction means comprises:

(a) first and second flip-flop logic elements, said first flip-flop logic element having a reset R input and each of said first and second flip-flop logic elements having a clock C input, a data D input and a Q output, the Q output of said first flip-flop logic element being coupled to the data D input of said second flip-flop logic element, the clock C input of said first flip-flop logic element being adapted to receive said second system timing signal, the data D input of said first flip-flop being adapted to receive said second servo control signal and the reset R input thereto coupled to the Q output of said second flip-flop logic element, the clock C input of said second flip-flop logic element being adapted to receive said reference signal;

(b) a NOR gate having a first input thereto coupled to the Q output of said second flip-flop logic element and a second input thereto adapted to receive said reference signal; and (c) an exclusive-OR gate having a first input thereto coupled to the output of said NOR gate and a second input thereto, adapted to receive a third system timing signal; the output of said exclusive-OR gate producing said local baud clock modified reference signal at a frequency less than or equal to said predetermined frequency.

18. The receiver of claim 17 further comprising a divider counter coupled to said exclusive-OR gate and having a clock C input adapted to receive said local baud clock modified reference signal, said divider counter having available said first, second and third system timing signals at respective output ports thereof.

19. The receiver of claim 14 further comprising a transition detector coupled to said second filtering means for determining when the digital data changes between successive data bit intervals.

20. The receiver of claim 19 wherein said transition detector comprises:

(a) a flip-flop logic element having a data D input coupled to the output of said second filtering means and a clock C input thereto adapted to receive said first system timing signal; and (b) an exclusive-OR gate having a first input thereto coupled to the Q output of said flip-flop logic element and a second input thereto coupled to the output of said second filtering means, the output of said exclusive-OR gate producing said transition signal indicative of whether the digital data has changed between successive data bit intervals.

21. The receiver of claim 14 wherein said select means comprises:

(a) a switch having a normally open terminal, normally closed terminal and a common terminal adapted to be coupled alternately to said normally open and normally closed terminals in response to said transition signal, said normally open terminal coupled to the output of said second multiplier means; and (b) a flip-flop logic element having a data D input coupled to said common terminal, a $\overline{Q}$ output coupled to said normally closed terminal, a clock C input adapted to receive an inverted first system timing signal and a Q output coupled to said second frequency generating means for supplying the second servo control signal thereto.

22. The receiver of claim 14 further comprising fourth filtering means coupling said third filtering means to said mixing means for increasing the signal to noise ratio in said first recovered modulation signal.

* * * * *